(12) United States Patent
Thomas et al.

(10) Patent No.: US 6,850,652 B1
(45) Date of Patent: Feb. 1, 2005

(54) TACTILE KINESTHETIC ASSISTANT

(75) Inventors: Brent D. Thomas, Chandler, AZ (US); Christine C. Thomas, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 09/656,973

(22) Filed: Sep. 7, 2000

(51) Int. Cl.[7] .................................................. G06K 7/00
(52) U.S. Cl. ........................ 382/312; 345/183; 358/473; 235/262.47; 382/140
(58) Field of Search .......................... 382/312, 140, 382/314, 313, 315, 316, 317, 319, 318, 321, 113; 345/179, 183, 181, 163; 434/309, 308, 320, 323, 324, 337; 235/462.42, 462.41, 462.47; 358/473, 474

(56) References Cited

U.S. PATENT DOCUMENTS

| | | | | |
|---|---|---|---|---|
| 5,608,624 A | * | 3/1997 | Luciw | 715/532 |
| 5,610,387 A | * | 3/1997 | Bard et al. | 235/462.44 |
| 5,945,656 A | * | 8/1999 | Lemelson et al. | 235/462.1 |
| 6,003,774 A | * | 12/1999 | Bard et al. | 235/462.45 |
| 6,057,966 A | * | 5/2000 | Carroll et al. | 359/630 |
| 6,145,746 A | * | 11/2000 | Bard et al. | 235/472.01 |
| 6,184,868 B1 | * | 2/2001 | Shahoian et al. | 345/161 |

OTHER PUBLICATIONS

Seiko Instruments Inc., Seiko Educational Products News: SII Seiko Instruments, http://www.readingpen.com/, 2000, pp. 1–3, Site Design by ReaLife WebDesigns.

\* cited by examiner

*Primary Examiner*—Bhavesh M. Mehta
*Assistant Examiner*—Seyed Azarian
(74) *Attorney, Agent, or Firm*—Steven D. Yates

(57) ABSTRACT

A tactile kinesthetic assistant is a device that allows a person to use the senses of sight, touch and hearing to gather information. Tactile kinesthetic assistants can be used, for example, to help a person retrieve information related to a specific word or phrase (e.g., a student learning to read), to allow a person to determine the status of a person or thing (e.g., a nurse retrieving medical records), to allow a person to obtain current information (e.g., a stock broker retrieving stock prices). In one embodiment, a tactile kinesthetic assistant includes a thimble and an ear piece. The thimble includes a scanner that allows the user to scan one or more words. The representations of the one or more words are used to retrieve information via a network and the retrieved information is provided to the user through an ear piece.

19 Claims, 6 Drawing Sheets

TACTILE KINESTHETIC ASSISTANT

FIELD OF THE INVENTION

The invention relates to information retrieval. More particularly, the invention relates to retrieving information related to a selected written word or phrase.

BACKGROUND OF THE INVENTION

Currently, when a reader comes across a word or phrase that is unknown to them, the reader can skip the word and hope to determine the meaning from the remaining material, or the reader can stop reading and obtain further information about the word. One common technique for obtaining information about a word is to use a dictionary. However, using a dictionary requires the reader to stop reading, open a separate book and search for the word or words in the dictionary. The reader can determine the appropriate meaning of the word and return to reading the original text. Use of a dictionary can be sufficiently inconvenient to the reader that the reader does not consult the dictionary when he/she encounters an unknown word, thereby depriving the reader of increased comprehension and fluency. Also, use of a dictionary may be difficult for certain readers, for example, readers with physical handicaps or dyslexic readers.

The READING PEN™ available from Seiko Instruments, USA of Torrance, Calif. allows a reader to scan a word using a hand held scanner and to retrieve information stored within the instrument. However, the READING PEN™ has a limited amount of memory, so the amount of information that can be stored for use by a reader is limited. Because memory can be expensive, increasing the amount of information available to a reader can become expensive. Increasing memory also increases the power requirements, which increases battery size and/or expense, or decreases battery life. Thus, the READING PEN™ can provide only a limited amount of information.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

A tactile kinesthetic assistant is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A tactile kinesthetic assistant is a device that allows a person to use the senses of sight, touch and hearing to gather information. Tactile kinesthetic assistants can be used, for example, to help a person retrieve information related to a specific word or phrase (e.g., a student learning to read), to allow a person to determine the status of a person or thing (e.g., a nurse retrieving medical records), to allow a person to obtain current information (e.g., a stock broker retrieving stock prices). In one embodiment, a tactile kinesthetic assistant includes a thimble and an ear piece. The thimble includes a scanner that allows the user to scan one or more words. The representations of the one or more words are used to retrieve information via a network and the retrieved information is provided to the user through an ear piece.

Figure 1:
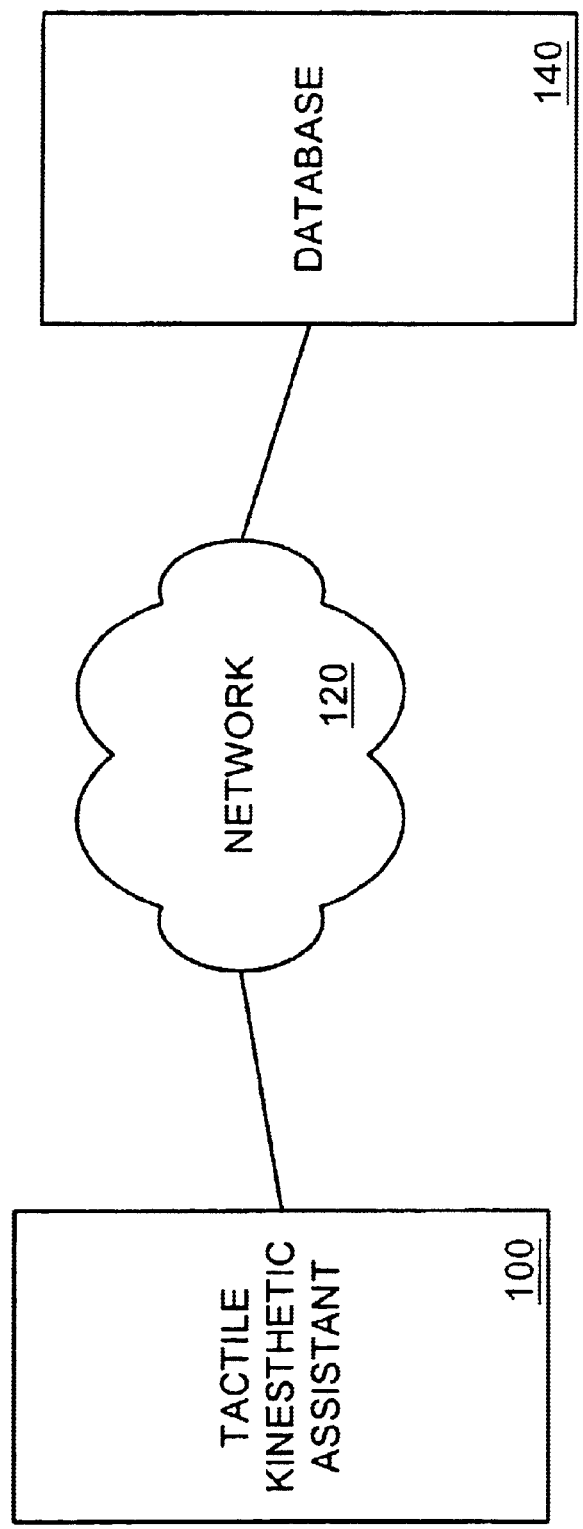
FIG. 1 is one embodiment of a tactile kinesthetic assistant informational pathway.

FIG. 1 is one embodiment of a tactile kinesthetic assistant informational pathway. Tactile kinesthetic assistant 100 allows a reader to scan or otherwise enter a word or phrase into the pathway. In one embodiment, tactile kinesthetic assistant 100 includes a scanner thimble worn on a reader's finger, an ear piece and an information gateway to interface to network 120.

In one embodiment, one or more components of tactile kinesthetic assistant 100 communicate using a wireless protocol. One wireless protocol that can be used is Bluetooth, which is a short range wireless communication protocol. Other wireless protocols as well as wired communications can also be used. The information gateway can be a computer system a set top box, a cellular phone, a personal digital assistant (PDA), a dedicated Internet gateway, or any other electronic system that provides access to network 120.

Network 120 represents any interconnection of networked devices. For example, network 120 can represent a local area network coupled to the Internet, or network 120 can represent the Internet only. Communications over network 120 can be accomplished in any manner known in the art, for example, via Transmission Control Protocol/Internet Protocol (TCP/IP).

Network 120 provides access to database 140. Database 140 can represent multiple physical devices. Database 140 stores information related to words or phrases. Database 140 provides information to tactile kinesthetic assistant 100 via network 120. In one embodiment, database 140 is a World Wide Web server that can interact with tactile kinesthetic assistant 100 over network 120.

Figure 2:
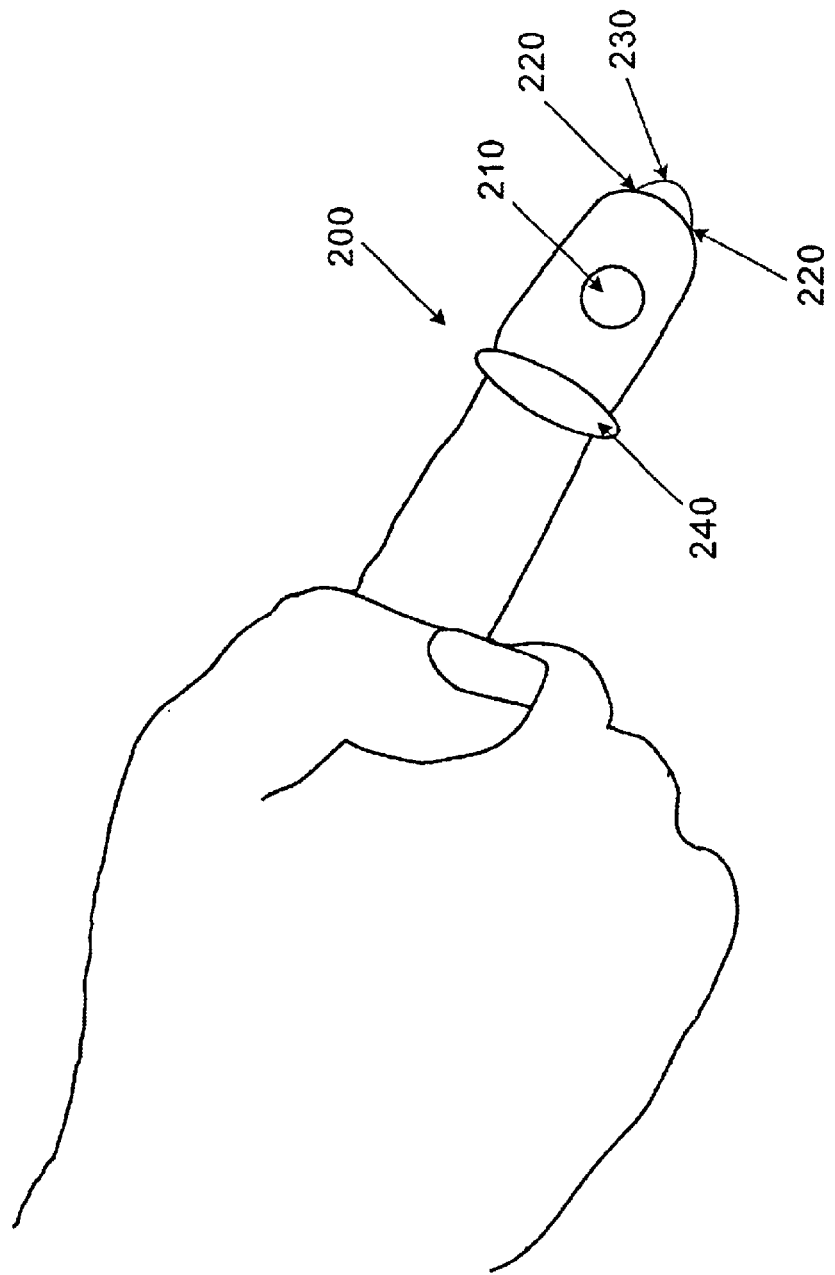
FIG. 2 is one embodiment of a scanner thimble for use in a tactile kinesthetic assistant.

FIG. 2 is one embodiment of a scanner thimble for use in a tactile kinesthetic assistant. While the example of FIG. 2 is a scanner thimble, the scanner for use in a tactile kinesthetic assistant can take other forms, for example, a writing instrument, a wrist watch, eye glasses with a microdisplay.

Thimble 200 is sized to fit the end of a reader's finger. Different sizes can be available for different sized fingers. In one embodiment, thimble 200 is made of a flexible material (e.g., rubber) that can stretch to fit a fingertip securely. In an alternate embodiment, thimble 200 can be made of a more sturdy material (e.g., aluminum) that does not flex.

In one embodiment, thimble 200 includes pressure switch 240 can be used with a docking station (not shown in FIG.

2) for battery recharging and/or other purposes. Other types of power switches, for example, an external power switch can also be used. Power is supplied by battery 210.

In one embodiment, battery 210 is a moldable lithium-ion polymer battery; however, other battery types can also be used. For example, battery 210 can be a chemical battery. Battery 210 can also be replaced by, or supplemented by, a solar power source (not shown in FIG. 2).

Lens 220 allows outside light to illuminate the word or words to be scanned. Scanner 230 scans one or more words as it is passed over the words allowing scanner 230 to scan using ambient light. A representation of the words is transmitted by a transmitter (not shown in FIG. 2) within thimble 200. The representation of the words can be a graphical encoded stream representing the word or words (e.g., a bitmap, symbol encoding) or the representation can be an indication of the word through, for example, use of optical character recognition (OCR) techniques. In an alternate embodiment, a light or other illumination device can be provided for self-illumination.

In one embodiment, the representation of the words is transmitted to a network gateway that provides access to an network. In an alternate embodiment, the transmitter transmits the representation of the words to an ear piece that, in turn, transmits the representation of the words to the network gateway. In one embodiment, the Bluetooth protocol is used to transmit the representation of the words; however, other protocols can also be used.

In one embodiment, the network gateway causes information related to the scanned words to be retrieved from one or more network resources. The network resources can be preselected (e.g., a specific database/dictionary) or the network gateway can cause a search to be performed in response to a word being scanned. The information retrieved over the network is returned to the tactile kinesthetic assistant.

In one embodiment, retrieved information is transmitted to an ear piece. The information can include, for example, a pronunciation, a definition, an exemplary use, a source of the audio information, and a source of additional information. The ear piece provides an audio output in response to one or more words being scanned. In one embodiment, thimble 200, the ear piece, the network gateway, or some other device allows the user to select and/or control the audio output. In an alternate embodiment, the audio output is provided by a speaker that is coupled to, for example, the network gateway.

In one embodiment, the tactile kinesthetic assistant includes a display device in addition to, or in place of, the ear piece. The display device can be, for example, a cathode ray tube (CRT), a liquid crystal display (LCD), a microdisplay that can be worn by the user, or any other display device.

Figure 3:
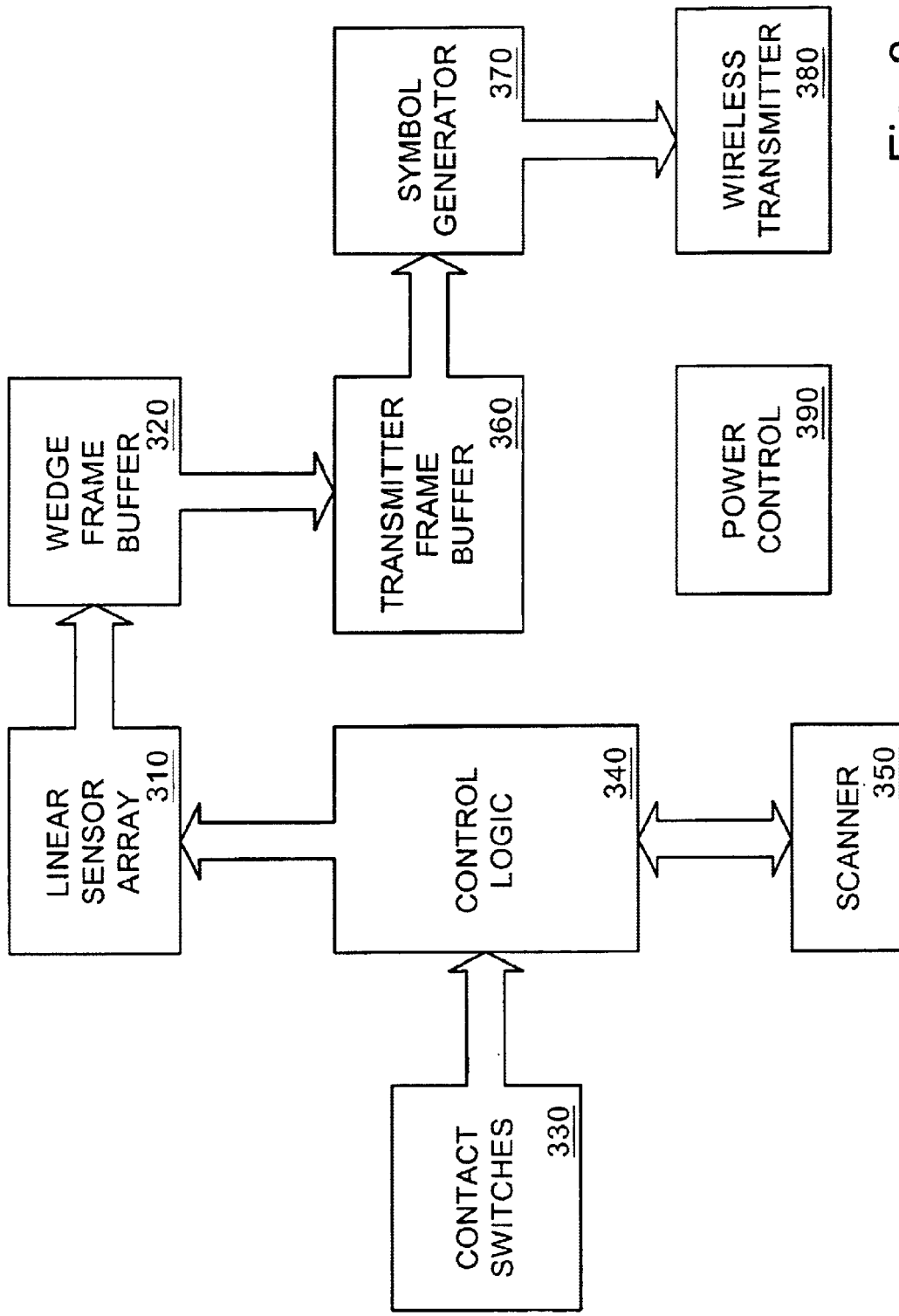
FIG. 3 is a conceptual block diagram of one embodiment of a scanner and transmitter for use with a tactile kinesthetic assistant.

FIG. 3 is a conceptual block diagram of one embodiment of a scanner and transmitter for use with a tactile kinesthetic assistant. As described above, in one embodiment, scanner 350 can be part of a thimble worn by a user. In alternate embodiments, scanner 350 can be part of another device.

Scanner 350 provides information to control logic 340. Control logic 340 also receives signals from contact switches 330. Contact switches 330 indicate whether the thimble is being worn by a user, or to provide other information. Control logic 340 controls scanner 350 based on signals received from contact switches 330 and from scanner 350.

Control logic 340 sends information related to what is scanned by scanner 350 to linear sensor array (LSA) 310. LSA 310 stores representations of words scanned with scanner 350. Wedge frame buffer 320 receives a frame of information from LSA 310. Transmitter frame buffer 360 receives the frame of information from wedge frame buffer 320 and forwards the information to symbol generator 370. Symbol generator 370 generates symbols representing the frame of information according to a predetermined encoding scheme. The symbols are provided to wireless transmitter 380 that transmits the symbols (e.g., to a network gateway or to the ear piece).

Power control 390 provides power to the components of FIG. 3. In one embodiment, power control 390 is a battery and associated power management hardware and/or software. In alternate embodiments, power control 390 can be a wired (either alternating current or direct current) power source.

Figure 4:
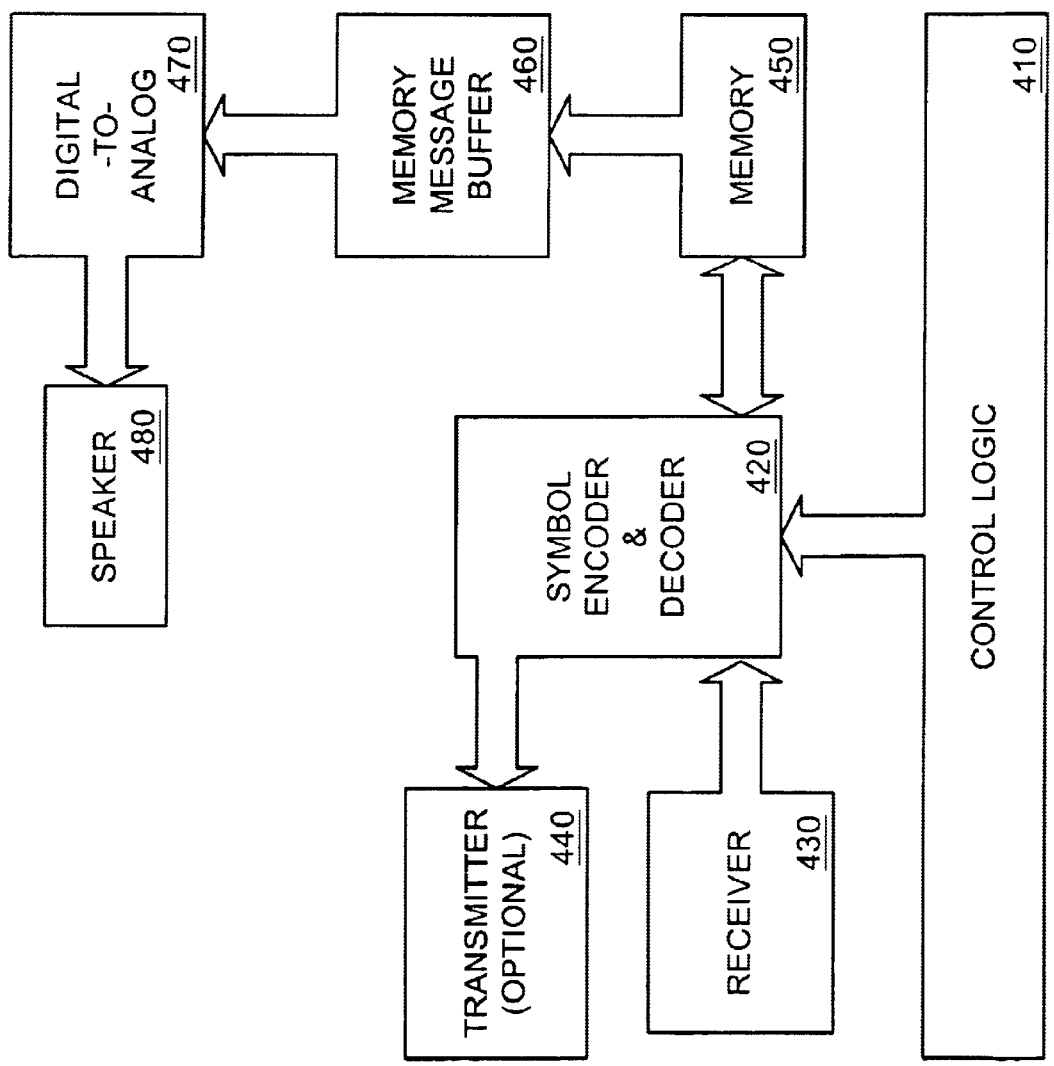
FIG. 4 is a conceptual block diagram of one embodiment of an ear piece for use with a tactile kinesthetic assistant.

FIG. 4 is a conceptual block diagram of one embodiment of an ear piece for use with a tactile kinesthetic assistant. Ear piece 400 includes receiver 430 that receives information from a remote source. In one embodiment, receiver 430 receives information from a transmitter coupled to a scanner (e.g., thimble 200) and/or from a network gateway. In alternate embodiments, ear piece 400 receives information from other sources (e.g., computer systems, set top boxes, personal digital assistants, cellular telephones)

In one embodiment, information received by receiver 430 is encoded as symbols according to a predetermined encoding scheme. Symbol encoder and decoder 420, under control of control logic 410, decodes the symbols received by receiver 430. In one embodiment, ear piece 400 includes a transmitter 440 to transmit information encoded by symbol encoder and decoder 420.

Symbol encoder and decoder 420 stores decoded information in memory 450. Symbol encoder and decoder 420 can also retrieve information to be encoded from memory 450. In one embodiment, memory message buffer 460 retrieves information from memory 450 for audio playback. Video playback, audio and video playback, as well as still graphical information can also be supported.

Memory message buffer 460 sends the information to be played to digital-to-analog decoder 470, which generates an analog signal from the digital information retrieved from memory 450. The analog signal is sent to speaker 480 for playback. In one embodiment, power is provided to ear piece 440 by a battery (not shown in FIG. 4). In alternate embodiments, power can be supplied in another manner.

Figure 5:
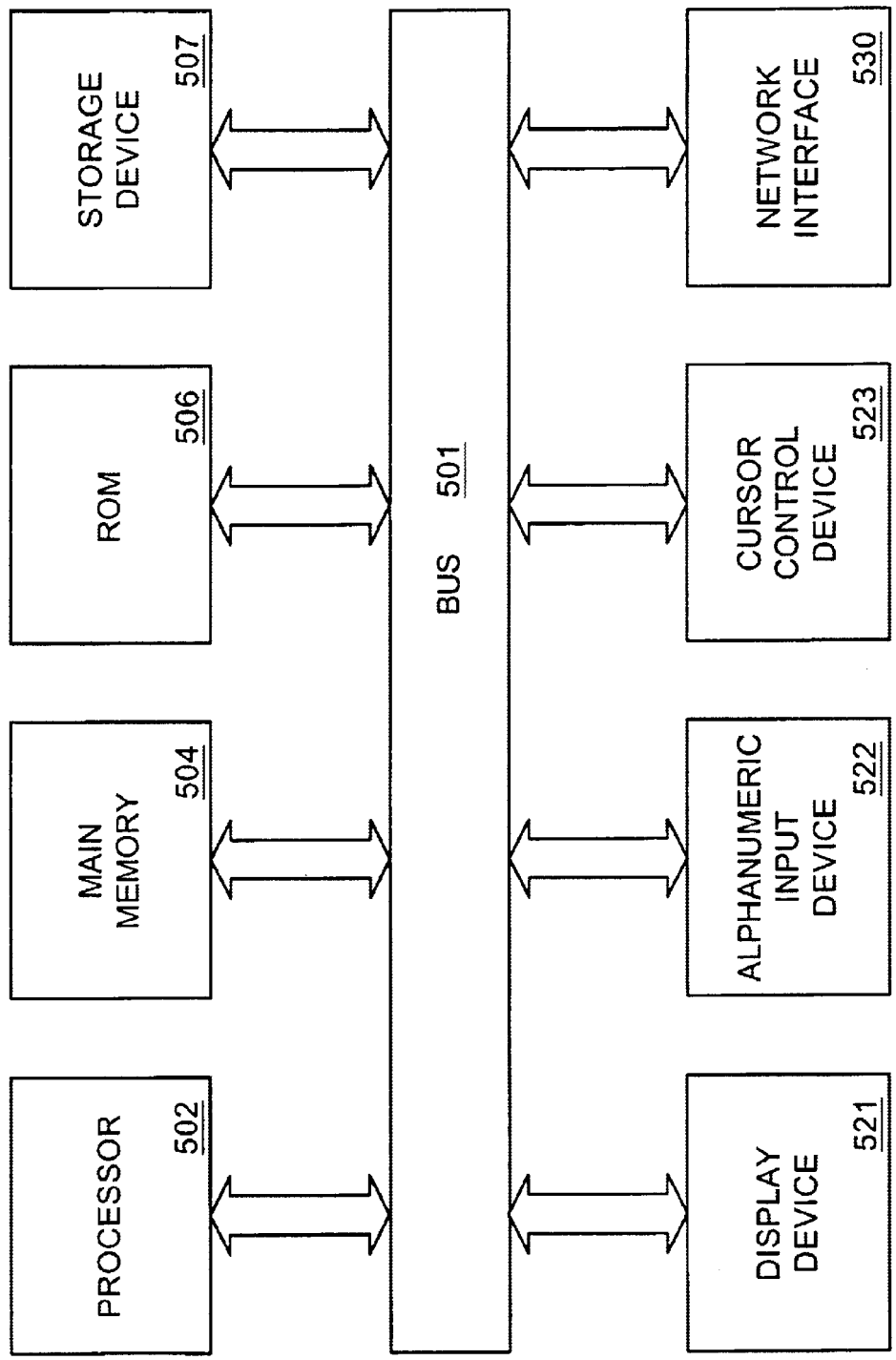
FIG. 5 is a block diagram of one embodiment of a network gateway.

FIG. 5 is a block diagram of one embodiment of a computer system. The computer system illustrated in FIG. 5 is intended to represent a range of computer systems. Alternative computer systems can include more, fewer and/or different components.

Gateway 500 includes bus 501 or other communication device(s) to communicate information, and processor 502 coupled to bus 501 to process information. While gateway 500 is illustrated with a single processor, gateway 500 can include multiple processors and/or co-processors. Gateway 500 further includes random access memory (RAM) or other dynamic storage device 504 (referred to as main memory), coupled to bus 501 to store information and instructions to be executed by processor 502. Main memory 504 also can be used to store temporary variables or other intermediate information during execution of instructions by processor 502.

Gateway 500 also includes read only memory (ROM) and/or other static storage device 506 coupled to bus 501 to store static information and instructions for processor 502.

Data storage device 507 is coupled to bus 501 to store information and instructions. Data storage device 507 such as a magnetic disk or optical disc and corresponding drive can be coupled to gateway 500.

Gateway 500 can also be coupled via bus 501 to display device 521, such as a cathode ray tube (CRT) or liquid crystal display (LCD), to display information to a computer user. Alphanumeric input device 522, including alphanumeric and other keys, is typically coupled to bus 501 to communicate information and command selections to processor 502. Another type of user input device is cursor control 523, such as a mouse, a trackball, or cursor direction keys to communicate direction information and command selections to processor 502 and to control cursor movement on display 521.

Instructions are provided to memory from a storage device, such as magnetic disk, a read-only memory (ROM) integrated circuit, CD-ROM, DVD, via a remote connection (e.g., over a network via network interface 530) that is either wired or wireless, etc. In alternative embodiments, hard-wired circuitry can be used in place of or in combination with software instructions to implement the present invention. Thus, the present invention is not limited to any specific combination of hardware circuitry and software instructions.

A machine-readable medium includes any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other form of propagated signals (e.g., carrier waves, infrared signals, digital signals), etc.

Figure 6:
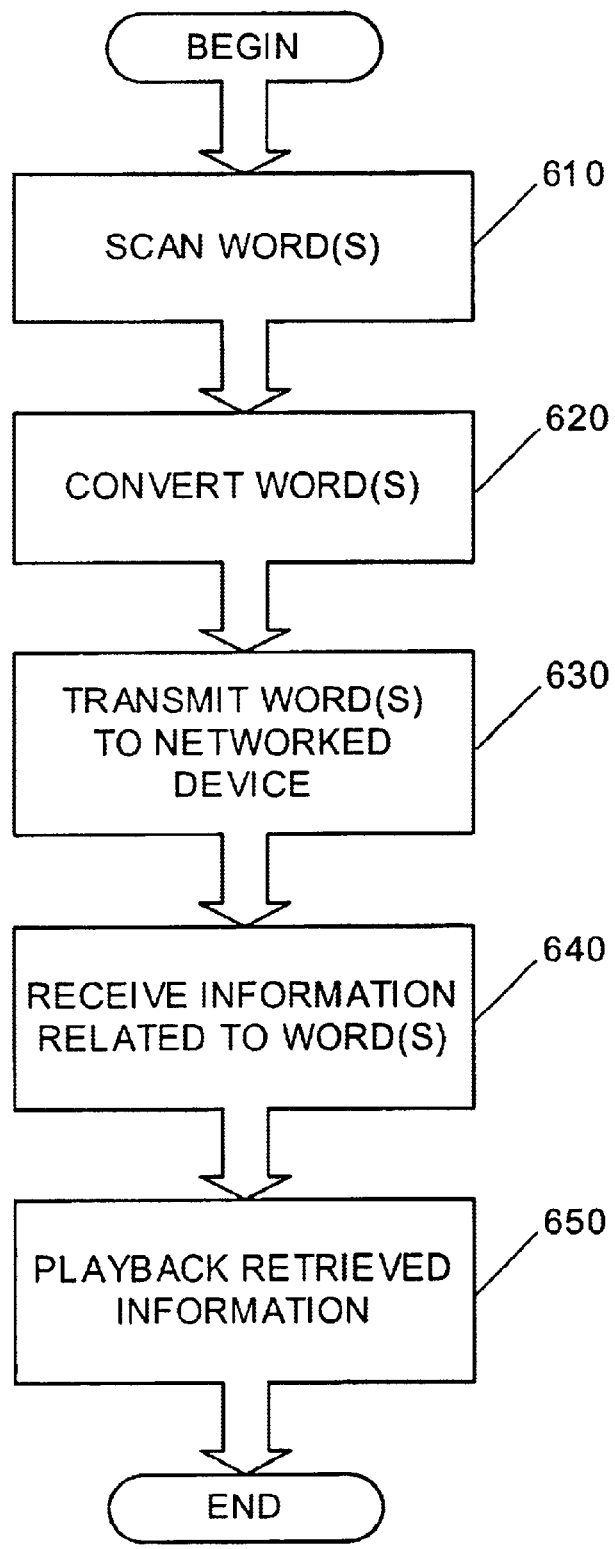
FIG. 6 is a flow diagram of one embodiment of use of a tactile kinesthetic assistant.

FIG. 6 is a flow diagram of one embodiment of use of a tactile kinesthetic assistant. One or more words are scanned at 610. As mentioned above, the scanner can be part of a thimble or another type of device.

The scanned word is converted at 620. The scanned word is converted to a digital format. Conversion can be accomplished in any manner known in the art. For example, OCR techniques can be used to determine the word(s) scanned and the converted word(s) can be stored at ASCII text, or in any other format.

The word(s) is/are transmitted to a networked device at 630. In one embodiment, transmission is accomplished according to a wireless protocol (e.g., Bluetooth); however, transmission can be accomplished in a wired manner. The networked device can be any device that provides, either directly or indirectly, network (e.g., Internet) access.

Information related to the scanned word(s) is retrieved at 640. Information can be retrieved from a single source or from multiple sources. In one embodiment the networked device that receives the word(s) retrieves the information; however, other electronic systems can be used to retrieve the information. Information can be retrieved from a predetermined source, or information can be retrieved as the result of a search.

The retrieved information is played back at 650. In one embodiment, the information is retrieved by the networked device and transmitted to an ear piece, or some other audio/video output device. In alternate embodiments, the information can be retrieved by one device and communicated to another device for transmission to the ear piece.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A system comprising:
    a scanning device to scan one or more printed words and to generate an indication of the one or more printed words, wherein the scanning device is attached to a user;
    a networked electronic device including a receiver to receive the indication of the one or more printed words, the networked electronic device to retrieve, via a network, information related to the one or more printed words, wherein the networked electronic device includes a first transmitter to transmit the information related to the printed word;
    an output device to output the information related to the one or more printed words.

2. The system of claim 1 wherein the scanning device attached to the user is a at least a portion of a thimble that can be worn on a tip of a user's finger.

3. The system of claim 2 wherein the thimble further comprises a second transmitter to transmit the indication of the printed word.

4. The system of claim 1 wherein the scanning device is coupled to the user.

5. The system of claim 1 wherein the output device comprises a receiver to receive the transmitted information related to the printed word.

6. The system of claim 5 wherein the output device comprises an ear piece having a speaker to output audio information related to the printed word.

7. The system of claim 6 wherein the audio information related to the printed word comprises at least one of: a pronunciation, a definition, an exemplary use, a source of the audio information, and a source of additional information.

8. The system of claim 5 wherein the output device comprises a visual display to display pictorial information related to the printed word.

9. The system of claim 8 wherein the pictorial information related to the printed word comprises at least one of: a representation related to the printed word, a source of the information, and a source of additional information.

10. A method comprising:
    scanning a printed word with a scanning device attached to a user, said scanning to generate an indication of a printed word; receiving the indication of the printed word from the scanning device attached to the user and responsive thereto' transmitting data over a network so as to facilitate;
    retrieving information related to the printed word over the network; and
    outputting the information related to the printed word.

11. The method of claim 10 further comprising transmitting the printed word to a networked electronic device.

12. The method of claim 10 wherein the scanning device comprises a thimble device having a scanner therein.

13. The method of claim 10 wherein outputting the information related to the printed word comprises playing audio information.

14. The method of claim 10 wherein outputting the information related to the printed word comprises displaying pictorial information.

15. A machine-readable medium having stored thereon sequences of instructions that, when executed, cause one or more electronic systems to:

scan a printed word with a scanning device attached to the user, said scanning to generate an indication of a printed word;

receiving the indication of the printed word from the scanning device attached to the user and responsive thereto' transmit data over a network so as to facilitate;

retrieving information related to the printed word over a network; and output the information related to the printed word.

16. The machine-readable medium of claim 15 further comprising sequences of instructions that, when executed, cause the one or more electronic systems to transmit the printed word to a networked electronic device.

17. The machine-readable medium of claim 15 wherein the scanning device comprise a thimble device having a scanner therein.

18. The machine-readable medium of claim 15 wherein outputting the information related to the printed word comprises playing audio information.

19. The machine-readable medium of claim 15 wherein outputting the information related to the printed word comprises displaying pictorial information.

* * * * *